（12） United States Patent
Österling

(10) Patent No.: US 8,050,296 B2
(45) Date of Patent: Nov. 1, 2011

(54) RADIO EQUIPMENT (RE)-BASED SYNCHRONIZATION

(75) Inventor: Jacob Kristian Österling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 797 days.

(21) Appl. No.: 12/147,258

(22) Filed: Jun. 26, 2008

(65) Prior Publication Data

US 2009/0245228 A1 Oct. 1, 2009

Related U.S. Application Data

(60) Provisional application No. 61/041,081, filed on Mar. 31, 2008.

(51) Int. Cl.
*H04L 12/56* (2006.01)
*H04J 1/16* (2006.01)

(52) U.S. Cl. ............... 370/503; 370/278; 370/329

(58) Field of Classification Search ............ 370/329, 370/278, 503
See application file for complete search history.

(56) References Cited

U.S. PATENT DOCUMENTS

| | | | |
|---|---|---|---|
| 6,370,600 | B1 | 4/2002 | Hughes et al. |
| 2009/0238154 | A1 | 9/2009 | Bommas et al. |
| 2011/0032910 | A1* | 2/2011 | Aarflot et al. ............ 370/335 |

FOREIGN PATENT DOCUMENTS

| | | |
|---|---|---|
| DE | 102006019475 A1 | 10/2007 |
| EP | 1 276 028 A1 | 1/2003 |
| WO | WO 00/76116 A1 | 12/2000 |
| WO | WO 2006/040653 A1 | 4/2006 |
| WO | WO 2008/022018 A2 | 2/2008 |

OTHER PUBLICATIONS

CPRI Specification V1.0; "Common Public Radio Interface (CPRI); Interface Specification;" Sep. 30, 2003; pp. 1-54.
International Search Report mailed Sep. 8, 2005 in related PCT Application PCT/SE2005/000767.
Written Opinion mailed Mar. 5, 2009 in corresponding PCT Application PCT/SE2008/051320.
Related U.S. Appl. No. 11/131,347, filed May 18, 2005; Inventor: Osterling et al.

* cited by examiner

*Primary Examiner* — John Pezzlo
(74) *Attorney, Agent, or Firm* — Nixon & Vanderhye P.C.

(57) ABSTRACT

A distributed radio base station includes a first radio equipment controller (REC) node, a second radio equipment controller (REC) node, and a radio equipment (RE) node for transceiving information over a radio interface with one or more radio terminals. The first REC node and the second REC node are physically separate from the RE node. The first REC node and/or the second REC node are/is connected to the RE node by a transmission link. Synchronization reference information is provided to one of the REC and RE nodes. The synchronization reference information in the one node is compared with timing information received from another of the REC nodes to generate a timing difference. The timing difference is used to adjust a timing unit at the another node in order to achieve timing synchronization between the RE node, the first REC node, and the second REC node.

32 Claims, 12 Drawing Sheets

RADIO EQUIPMENT (RE)-BASED SYNCHRONIZATION

PRIORITY APPLICATIONS

Priority is claimed from U.S. provisional patent application Ser. No. 61/041,081, filed on Mar. 31, 2008, the disclosure of which is incorporated herein by reference.

TECHNICAL FIELD

The technical field relates to radio communications, and the technology in this application relates to synchronizing a distributed radio base station.

BACKGROUND

A distributed radio base station (RBS) typically includes one radio equipment controller (REC) coupled to one or more local or remote radio equipments (REs). But there are situations when it would be desirable to include multiple RECs in the distributed radio base station. For example, it is technically feasible for an RE to supporting multiple wireless communication standards simultaneously. Multiple low-cost RECs connected to one RE may be employed to service radio communications based on different radio wireless standards, e.g., WCDMA and the Long Term Evolution (LTE) of the Universal Mobile Telecommunications System (UMTS) wireless communication standards. Multiple RECs connected to one RE may also be useful to increase the capacity and/or performance of the radio base station.

Synchronization is an important issue in distributed radio base stations. Some wireless communication standards, e.g., LTE, require time synchronization accuracy on the order of 1 microsecond. In practice, this kind of time synchronization accuracy may require a GPS receiver or other accurate timing reference on the radio base station site. Accordingly, it is desirable that base stations in evolving generations of wireless communications systems support low-cost global positioning (GPS) deployment. A GPS receiver should be located for good satellite reception. This often means a placement on the base station tower or mast, which suggest at least close proximity to the RE. It is desirable to mount the GPS receiver within the mechanical solution of the RE, e.g., bolted directly on the RE to provide an aesthetically appealing appearance. In such an installation, if the GPS receiver is connected to the REC, this requires long cable runs and lightning protection, both of which are not desirable.

A distributed radio base station may, for example, be based on the Common Public Radio Interface (CPRI) standard which defines the interface between the REC and one or more local or remote REs. The CPRI standard version 3.0 is incorporated herein by reference. Commonly-assigned and related U.S. patent application entitled "Determining A Time Difference Between First And Second Clock Domains," Ser. No. 11/131,347, filed on May 18, 2005, is also incorporated here by reference. Multi-REC distributed radio base stations are not supported in the current CPRI standard. If an REC is built using multiple boards or units, dedicated and proprietary synchronization solutions can be used, but it would be desirable to standardize multiple-REC distributed radio base stations in CPRI.

Two or more RECs serving the same RE must have a common frequency reference. Otherwise multiple problems occur such as no coordination to achieve a common the transmission/reception frequency and "bit slips" on the interface between RECs and RE(s), such as the CPRI interface, which in turn generate distortion in the air interface. The RECs should also have a common time reference; otherwise, the RE needs to maintain multiple time bases (one for each REC) to refer air interface measurements to.

Traditionally, base stations are synchronized to the incoming transport network by extracting the bit clock of the transport network. If one of multiple RECs in a base station has access to an SDH or PDH transport network, it can regenerate a frequency reference. But some RECs may not have direct access to a transport network providing a stable bit clock, e.g., the RECs only have access to an Ethernet interface. An REC only connected to an Ethernet transport network needs to have a highly stable oscillator or access to a GPS receiver.

Two RECs sharing an RE may be connected with an extra dedicated cable to make sure they are synchronized. But this approach decreases the reliability of the base station because of an increased probability of a fatal fault (the extra cable may break) and increases the cost of the base station. It is more advantageous to utilize a cable already present in the base station.

SUMMARY

The technology in this application solves these problems and achieves the desirable objects described in the background. A distributed radio base station includes a first radio equipment controller (REC) node, a second radio equipment controller (REC) node, and a radio equipment (RE) node for transceiving information over a radio interface with one or more radio terminals. The first REC node and the second REC node are physically separate from the RE node. The first REC node and/or the second REC node are connected to the RE node by a transmission link. Synchronization reference information is provided to one of the REC and RE nodes. The synchronization reference information in the one node is compared with timing information received from another of the REC nodes to generate a timing difference. The timing difference is used to adjust a timing unit at the other node.

In one example application, the first REC node is configured to operate in accordance with a first type of radio communications technology, and the second REC node is configured to operate in accordance with a second different type of radio communications technology. Alternatively, both REC nodes may be configured to operate in accordance with the same type of radio communications technology.

In preferred example embodiments one or more interfaces between the nodes in radio base station is a CPRI interface. The synchronization reference information may include timing information, frequency information, or both.

In an example configuration, the one node is one of the REC nodes, the comparing is performed in the RE node or in one of the REC nodes, and the RE node synchronizes its timing to the synchronization reference information received from the one node. In another example configuration, the one node is the RE, and the comparing is performed in the RE node or in one of the REC nodes. Alternatively, the REC nodes are connected in cascade, and one REC node passes the timing difference to the other REC node. In another example configuration, the REC nodes are connected in parallel and one REC node passes the timing difference to the other REC node or the RE node passes the timing difference to the other REC node. Alternatively, multiple RE nodes are connected in cascade, and at least one REC node is connected to each RE node.

The RE node may, for example, receive GPS timing information, and the synchronization reference information is based on the received GPS information. Alternatively, the REC node may receive the synchronization reference information from a transport network.

Another example embodiment relates to a radio equipment (RE) node that includes a controller, radio transceiving circuitry, coupled to the controller, for transceiving information over a radio interface with one or more radio terminals, and one or more communications link interfaces for communicating with a first radio equipment controller (REC) node and a second radio equipment controller (REC) node. The RE node and the first and second REC nodes together form a radio base station. The RE node has a timing unit for receiving synchronization reference information and a comparator for comparing synchronization information from one of the first REC node and the second REC node with the synchronization reference information. The RE node provides synchronization adjustment information for use at the one REC node to permit sychronization between the first REC node, the second REC node, and the RE node. In a non-limiting example implementation of this embodiment, the timing unit includes an air frame counter which is loaded with a value corresponding to the synchronization reference information. The RE node may receive the synchronization reference information from one of the REC nodes or from an external timing source.

Another example embodiment relates to a first radio equipment controller (REC) node that includes a controller, an RE communications link interface for communicating with a first radio equipment (RE) node, and an REC communications link interface for communicating with a second radio equipment controller (REC) node. The RE node and the first and second REC nodes together form a radio base station. The first REC provides to the second REC timing difference information determined between synchronization reference information and timing information received from the second REC to achieve timing synchronization between the RE node, the first REC node, and the second REC node. In a non-limiting example implementation of this embodiment, a timing comparator connected to a timing unit in the first REC compares the synchronization reference information with timing information received from the second REC to generate the timing difference and provides the timing difference information to the second REC over the REC communications link interface. The first REC node may receive the synchronization reference information from the RE node or from an external timing source.

DETAILED DESCRIPTION

In the following description, for purposes of explanation and non-limitation, specific details are set forth, such as particular nodes, functional entities, techniques, protocols, standards, etc. in order to provide an understanding of the described technology. For example, some example embodiments use a CPRI-based system. But the technology is not limited to CPRI-based systems. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

Figure 1:
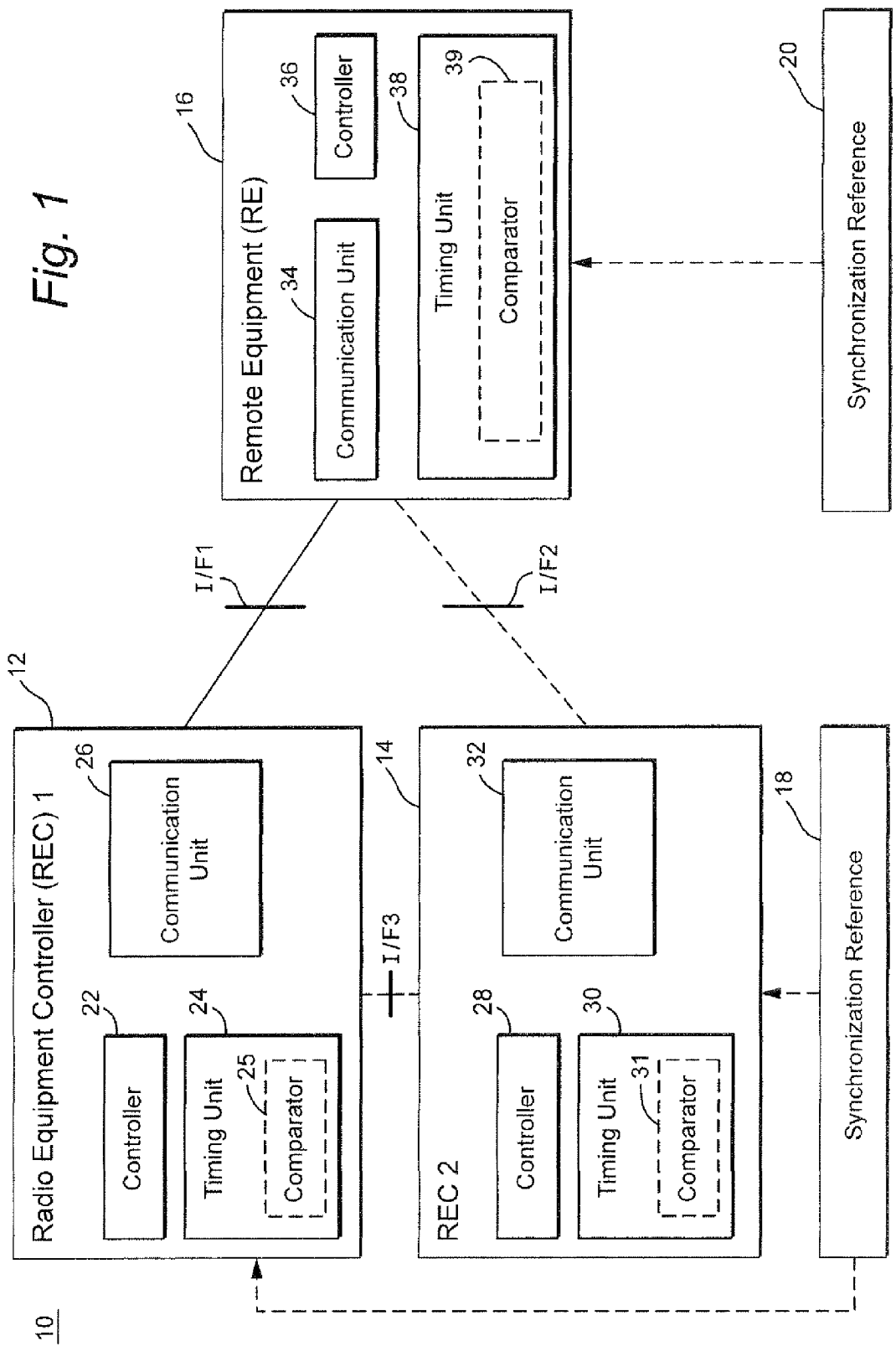
FIG. 1 is a non-limiting, example function block diagram of a distributed radio base station with multiple RECs having various potential configurations and synchronization options.

FIG. 1 is a non-limiting, example function block diagram of a distributed radio base station 10, with multiple RECs 12 and 14 and at least one RE 16, having various potential configurations and synchronization options. The REC1 12 includes a communications unit 26 that services the interface I/F1 with the RE 12. Depending on the configuration of the base station, the REC1 12 may also communicate directly with the REC2 14 over its own interface I/F2 (shown as a dashed line to indicate that it is optional depending on the configuration). A controller 22 controls the overall operation of the REC 12, and timing unit 24 is responsible for generating the timing for the REC1 and for ensuring that the REC1 attains synchronization and remains synchronized with the timing for the base station 10. A comparator 25 in the timing unit 24, (shown with dashed lines because its use depends on the base station configuration), may be used to compare other REC timing information with external synchronization reference timing information to determine a timing the difference. The synchronization reference timing information may be provided directly to the REC1 as shown via a dashed line from block 18 or from the RE which receives external synchronization reference timing information via a dashed line from block 20. That difference is provided to at least one REC, here REC2, either directly over I/F3 or via the RE over I/F2, where that difference is used to control (e.g., adjust) the REC's own timing unit. Similarly, REC2 14 includes a controller 28, timing unit 30, optional comparator 31, and communication unit 32.

The RE 16 includes a communications unit 34 that services the interface I/F1 with at least one REC1 12. Depending on the configuration of the base station, the RE 16 may also communicate directly with the REC2 14 over its own interface I/F2 (shown as a dashed line to indicate that it is optional depending on the configuration). A controller 36 controls the overall operation of the RE 16, and timing unit 38 is responsible for generating the timing for the RE and for ensuring that the RE attains synchronization and remains synchronized with the timing for the RECs and any other REs in the base station 10. A comparator 39 in the timing unit 38, (shown with dashed lines because its use depends on the base station configuration), may be used to compare REC timing information with external synchronization reference timing information to determine a timing the difference. The synchronization reference timing information may be provided directly to the RE as shown via a dashed line from block 20 or from one of the RECs which receives external synchronization reference timing information via a dashed line from block 18. That difference is provided to at least one REC, either directly over I/F1 or I/F2 or via another REC if an REC-REC interface like I/F3 exits, where that difference is used to control (e.g., adjust) the REC's own timing unit.

Figure 2:
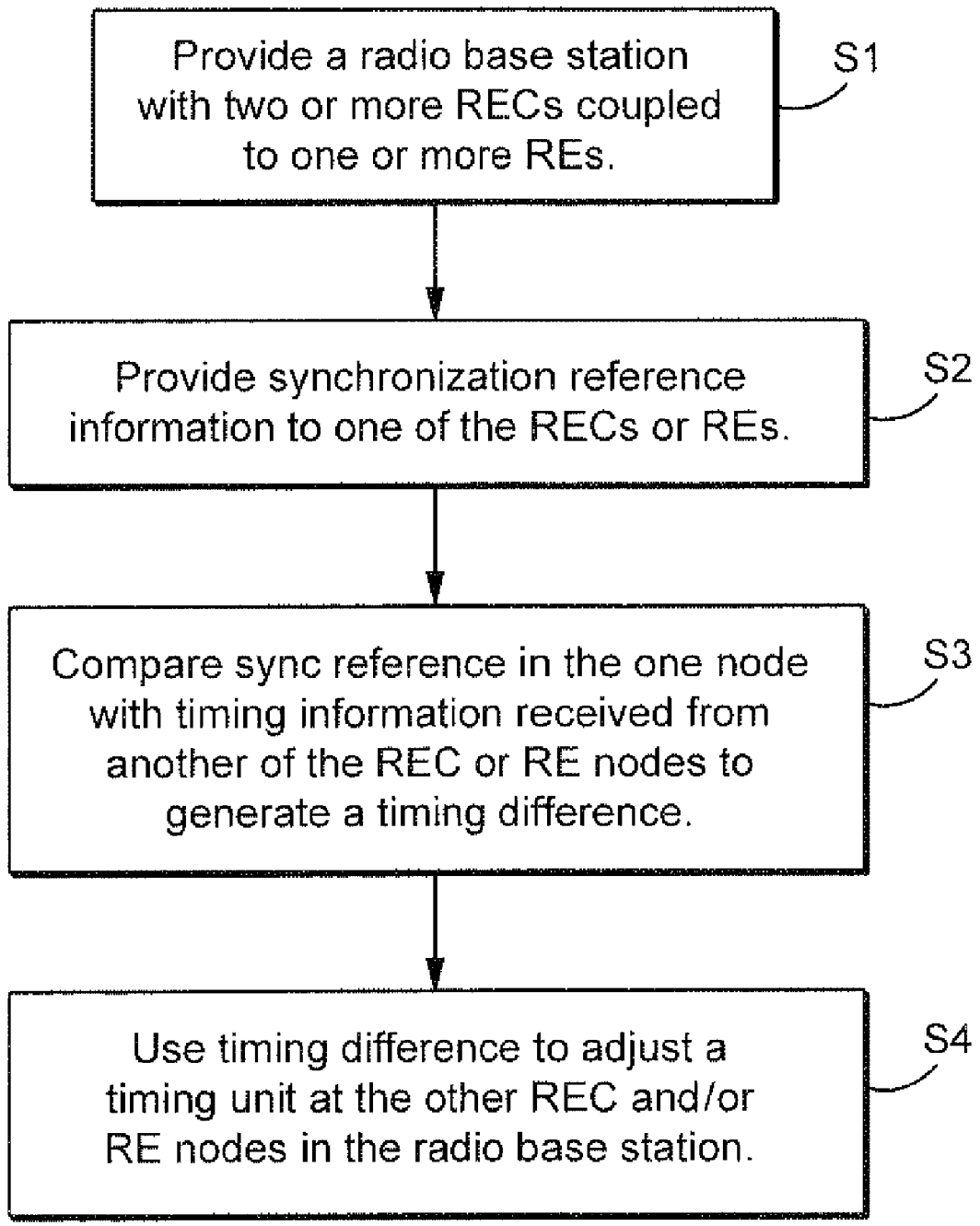
FIG. 2 is a flow chart diagram illustrating non-limiting, example procedures for synchronizing the RECs and RE(s) in a distributed radio base station.

FIG. 2 is a flow chart diagram illustrating non-limiting, example procedures for synchronizing the RECs and RE(s) in a distributed radio base station. A distributed radio base station is provided with two or more RECs coupled to at least one RE (step S1). The synchronization reference information is provided to one of the REC or RE nodes (step S2). The synchronization reference is compared with timing information received from another of the REC or RE nodes to generate a timing difference (step S3). The timing difference is then used to adjust the timing unit at the another REC node in the radio base station to achieve timing synchronization between the RE and the multiple REC nodes.

Figure 3:
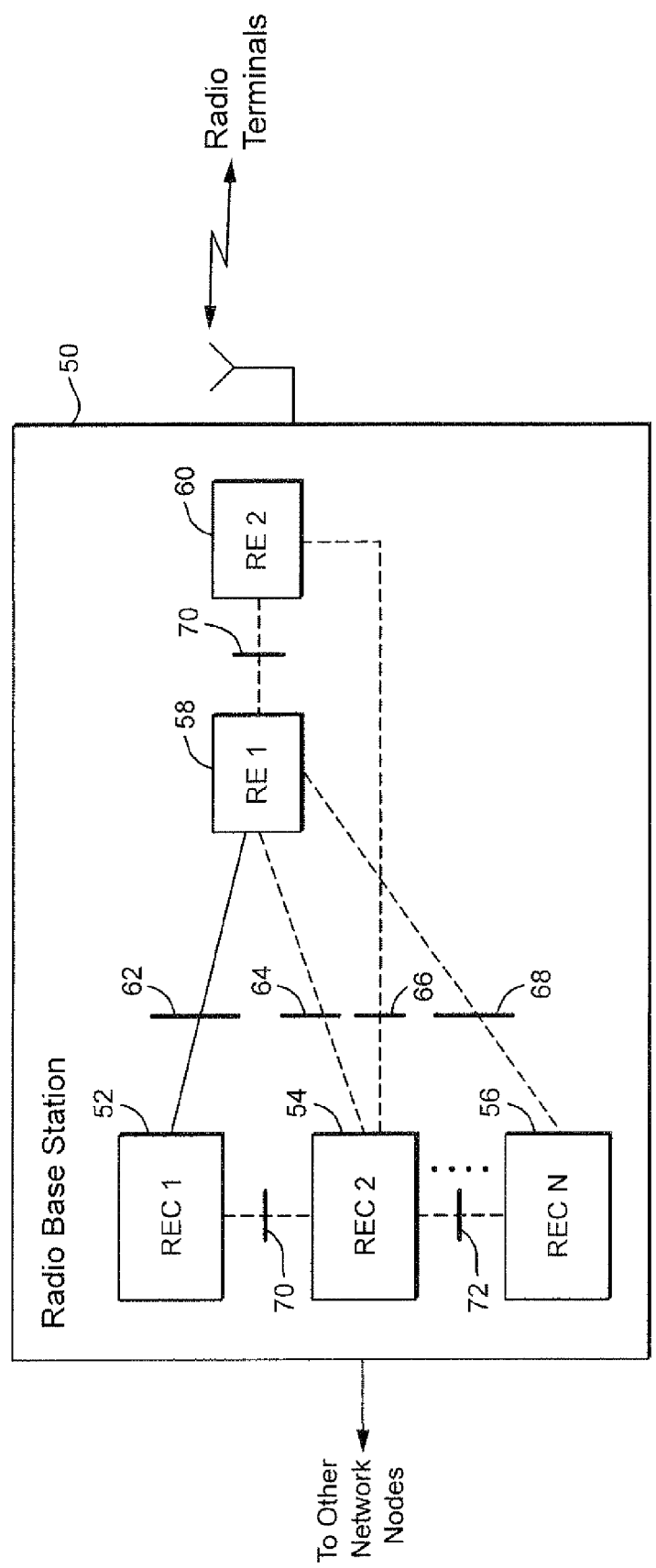
FIG. 3 is another non-limiting, example function block diagram of a distributed radio base station with multiple RECs and multiple REs having various potential configurations and synchronization options.

FIG. 3 is another non-limiting, example function block diagram of a distributed radio base station with multiple RECs and multiple REs having various potential configurations and synchronization options. The radio base station 50 communicates with radio terminals over an interface via one or more antennas. The base station also communicates with other network node(s) over suitable interface(s). While example embodiments show two REC nodes coupled to one RE node, more than two REC nodes may be coupled to an RE node. In FIG. 3, N REC nodes labeled as 52, 54, and 56 are coupled to a first RE node 58. These N REC nodes may be coupled to the first RE node 58 in parallel over corresponding direct interfaces 62, 64, and 68, respectively. Alternatively, the N RECs may be connected in a cascade configuration and communicate with the first RE 58 via REC-REC interfaces 70 and 72. These inter-REC interfaces permit timing information to be transferred along the REC cascade chain. Preferably, any timing adjustment is compensated for propagation delays in the base station, i.e., the amount of time it takes for the synchronization signal to propagate from the REC timing unit to the measurement point. The base station 50 may also include multiple RE nodes. The two RE nodes 58 and 60 communicate over an RE-RE interface 70. The second RE node may also have a direct connection to one or more of the RECs. In this example, a representative connection between the RE 60 and the REC 54 is shown via interface 66.

Figure 4:
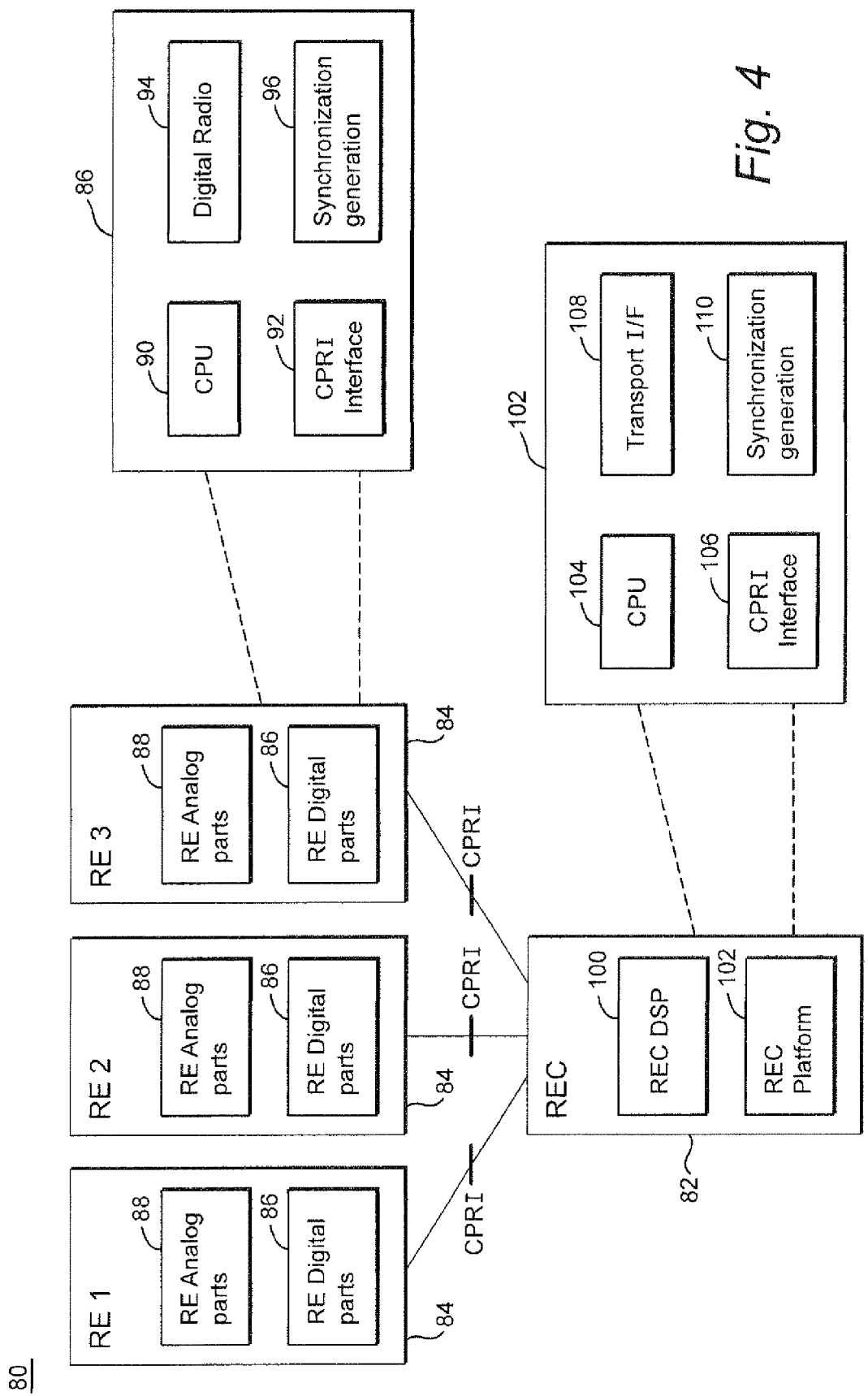
FIG. 4 is a non-limiting, example function block diagram of a CPRI-based distributed radio base station.

FIG. 4 is a non-limiting, example function block diagram of a CPRI-based distributed radio base station 80. Three REs 84 (RE1, RE2, and RE3) are shown coupled to an REC 82 which communicate with the REC 82 over respective CPRI interfaces. Each RE includes an analog part 88 and a digital part 86. The analog part includes radio transceiving circuitry, amplifiers, filters, etc. The digital part 86 includes several functional blocks. A CPRI interface block 92 orchestrates receiving and transmission in the proper format at the proper timing over the CPRI interface, recovers the CPRI interface clock (for frequency regeneration in the RE), detects the base station's Frame Number (BFN) number and frame start. The synchronization generation block 96 generates clock signals that are phase coherent to the REC clocks (including BFN and frame start) based on the input from the CPRI interface block 92 and information about CPRI propagation delay. The digital radio block 94 performs various signal processing functions like channel filtering and clipping. The CPU 90 controls the operation of the RE 88.

The REC 82 includes a digital signal processing (DSP) part 100 for conducting traffic handling and a platform part 10 including several functional blocks. A CPRI interface block 106 receives and transmits the CPRI interface information using the CPRI format. The synchronization generation block 110 generates the necessary time and frequency clocks in the radio base station based on the provided time and/or frequency references. The transport (TN) interface block 108 receives and transmits signals to the transport network interface to provide connectivity to the core network. The TN interface 108 also extracts received transport network interface clocks and other transport-based synchronization references such as NTP. These synchronization references are forwarded to the synchronization generation block and may be used as references to the base station clocks. The CPU 104 controls the operation of the REC 82.

The REC 82 and REs 84 are connected via a CPRI interface. The REC's synchronization generation block 110 generates the CPRI time and frequency, and the RE regenerates the CPRI time and frequency in its synchronization block 96. The frequency is regenerated to provide a stable frequency for the RF carrier generation. The time is regenerated to do time measurements between incoming timing references. The REC bases its CPRI time and frequency synchronization on time and frequency references from the transport network or from GPS signals. One or more GPS receivers may be connected to the REC.

A feature of CPRI is that it permits cascading REs. In that configuration, the time reference is forwarded from one RE to the next. The technology described in this application can be applied to any RE in a cascaded chain.

Figure 5:
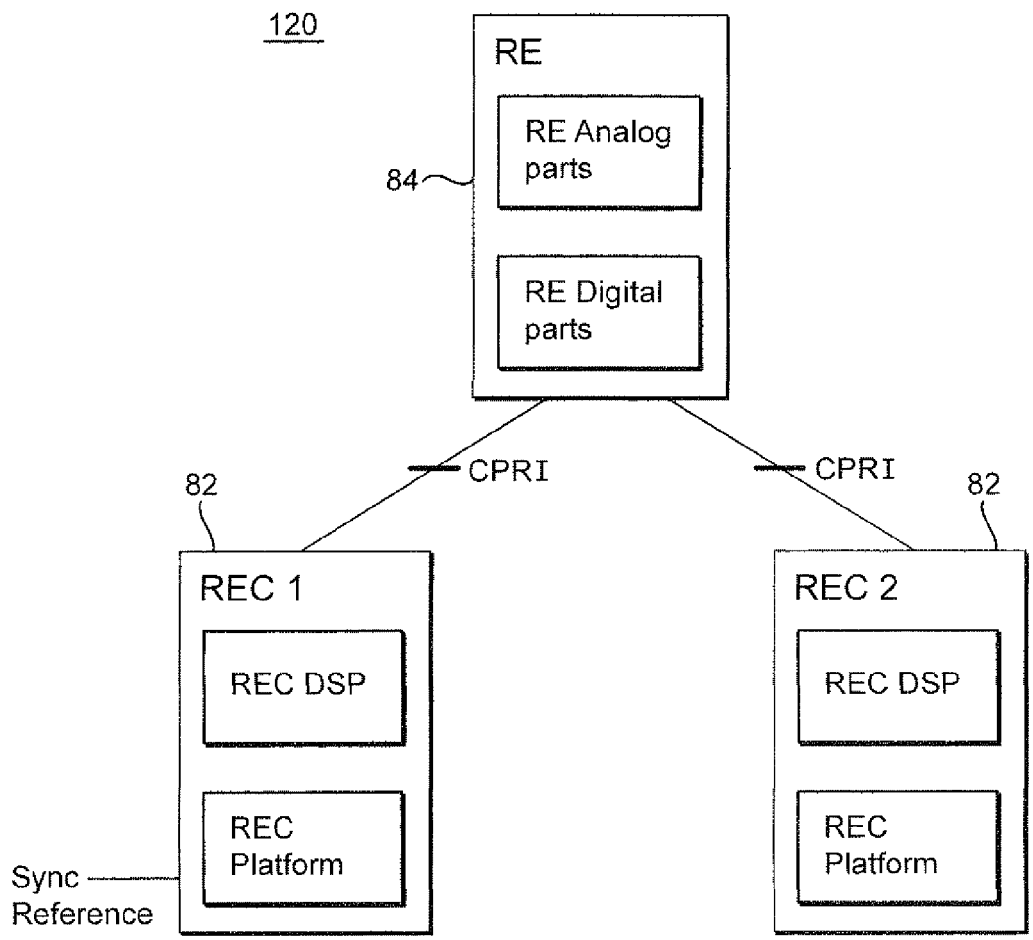
FIG. 5 is a non-limiting, example function block diagram of a CPRI-based distributed radio base station having multiple RECs.

FIG. 5 is a non-limiting, example function block diagram of a CPRI-based, multi-REC radio base station 120 having two RECs 82 (more RECs could be used) coupled to one RE 84. In this configuration, one of the RECs has access to an external synchronization reference. One of the RECs could be for example a WCDMA REC1 and the other a LTE REC2, where the WCDMA REC1 has access to a transport network STM-1 bit clock as an external synchronization reference. Over their respective CPRI interfaces, both RECs provide time and frequency information to the RE. The RE is informed that REC1 is the synchronization master, and the RE uses the CPRI interface to REC1 as the reference for its synchronization block 96. The RE only measures timing information on the other REC2/CPRI interface. In this non-limiting example embodiment, a phase comparator in the RE compares the timing information received via those two CPRI interfaces to determine a difference between the references. The measured time difference is sent by the RE to the slave REC2 on a control and management (C&M) link provided by the CPRI interface. The REC2 can then adopt the time and frequency of the master REC1 which has the external synchronization reference with the result that the RE, REC1, and REC2 are all synchronized.

Because the phase comparison is performed at the RE 84 and the two RECs communicate with the same RE, they can be readily synchronized. As compared to using a separate synchronization interface between the two RECs, this synchronization approach decreases the probability of a fatal fault in extra cabling as described in the background. Another advantage in this example embodiment is that both the RECs and the RE have the same roles in a single-REC RBS and a multi-REC RBS. The RECs consistently generate the CPRI synch information, and the RE consistently regenerates it.

Figures 6, 7:
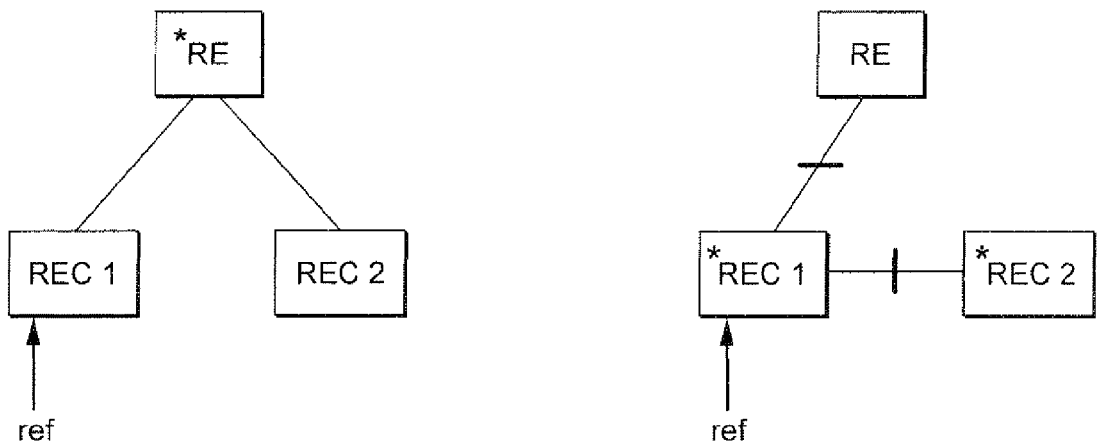
FIGS. 6-13 illustrate various non-limiting example distributed radio base station configurations that may be used to synchronize multiple RECs with one or more REs.

FIGS. 6-13 illustrate various non-limiting example distributed radio base station configurations that may be used to synchronize multiple RECs with one or more REs. These configurations may be used for any distributed base station using multiple RECs including but not limited to CPRI implementations. The configuration used depends on the availability of the interfaces and support for redundancy. FIG. 6 shows in generic form the configuration already described in a CPRI-specific context in FIG. 5.

In FIG. 7, only one REC1 interfaces with the RE, the REC1 and REC2 are connected in cascade, and the synchronization reference is provided by the master REC1. The phase/timing difference determination (the location of that determination is indicated by an asterisk) may be performed by REC1 interfacing with the RE. REC2 provides its timing information to REC1, REC1 compares that time information received from REC2 with the synchronization reference, and sends the difference back to REC2. REC2's timing block then adjusts its timing based on that difference so that the RE, REC1, and REC2 are synchronized. The asterisk in REC2 means that in an alternate configuration, REC2 may determine its timing difference based on the timing reference from REC1 and adjust its timing to synchronize with that of REC1. In both variations, the REC1 provides the timing reference information to the RE. The CPRI propagation delay between REC1 and REC2 can be measured by either (or both) of REC1 and REC2. One non-limiting example method is that described in the CPRI specification with one of the REC acting as a master port and the other REC acting as a slave port.

Figure 8:
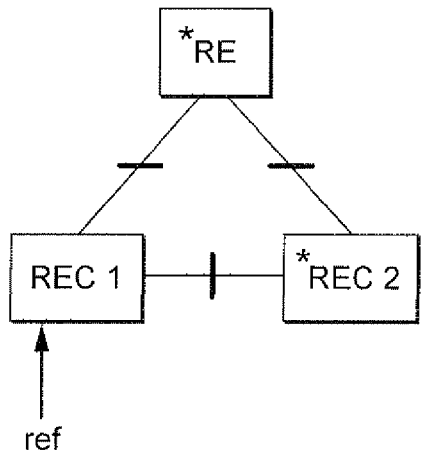

FIG. 8 shows a configuration where both REC1 and REC2 interface with the RE and with each other. The synchronization reference is provided by the master REC1. The phase/timing difference determination may be performed by the RE (indicated by an asterisk) as in FIG. 6. In addition to the interfaces between each REC and the RE, the configuration contains interfaces between the RECs. The REC-REC interface can be used if the interface between one of the RECs and the RE fails. For instance, if the interface from REC2 to RE fails, the configuration becomes the same as that of FIG. 7. Alternatively, the phase/timing difference determination (indicated by an asterisk) may be performed by the REC2 in a fashion similar to that described above for FIG. 7, with the difference that the timing synchronization information is sent directly from REC2 to the RE.

Figure 9:
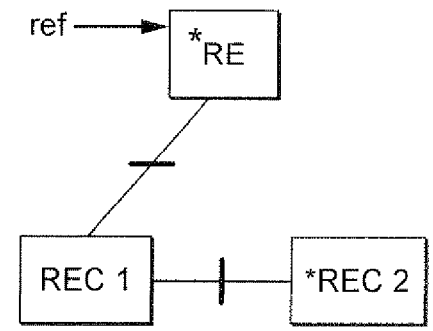
Figure 10:
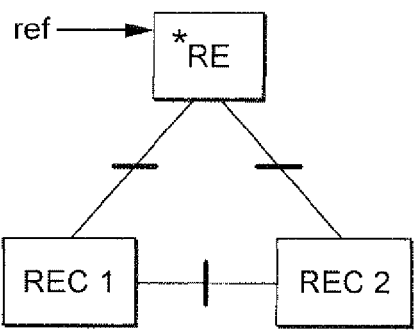
Figure 11:
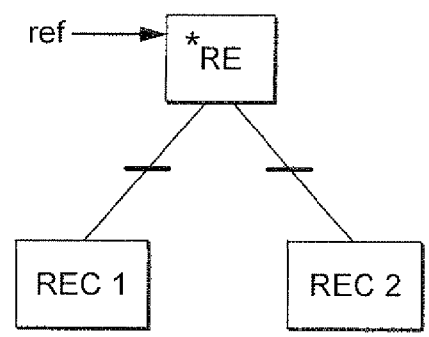

FIGS. 9-11 show configurations where the synchronization timing reference is provided to the RE rather than the REC1, and the RE performs the phase/timing comparisons. That means that the RE makes timing comparisons for both REC1 and REC2 and sends respective timing differences to them both so each can synchronize it timing. If a GPS receiver is used in the base station, it is advantageous to provide the GPS reference to the RE because the GPS receiver is better situated to receive GPS satellite signals in or near the RE since it is often located on a mast or tower as compared to the REC which is often located on the ground. This allows for implementations where the GPS is located under the "sun shield" of the RE, and thus, requiring little or no lightning protection of its signal cables if terminated in the RE. Furthermore, it provides an aesthetically appealing installation as no GPS antenna or extra signal cables are visible to the eye.

A GPS receiver provides two kinds of signals to the RBS: time-of-day clear text information and a time-of-day pulse indicating when the clear-text information applies. The pulse is sent one time a second and is thus called the Pulse-Per-Second (PPS). The REC Synchronization block wants to know the time-of-day in relation to the time reference of the RBS in order to "phase lock" and "frequency lock." With a GPS receiver connected to the RE, the RE samples the GPS time reference and sends a clear text message and the sampled synchronization time (e.g., a frame number and fraction of a frame) to one or more RECs on one or more C&M links, depending on the configuration.

In FIG. 9, only REC1 is coupled to the RE. REC1 sends only the timing information from REC1 to the RE. The RE compares that timing information to the reference and sends a timing adjustment message to REC1. The REC1 applies the timing adjustment messages and thus becomes synchronized to the external reference source. In this example configuration, the REC2 also is shown with an asterisk because the REC2 then determines the timing difference of its internal clock compared to synchronization signals received from the REC1. The timing blocks in REC1 and REC2 adjust their timing based on their respective differences so that the RE, REC1, and REC2 are synchronized.

The configurations in FIGS. 10 and 11 are similar to that of FIG. 8 except that the RE receives the synchronization timing reference. The RE receives the timing information from REC1 and REC2 and provides respective timing adjustments either to each of them over their respective interface, or to only one of the RECs in FIG. 10, which then forwards the other REC's timing adjustment over the REC1-REC2 interface. The latter option is not available in FIG. 11.

Figure 12:
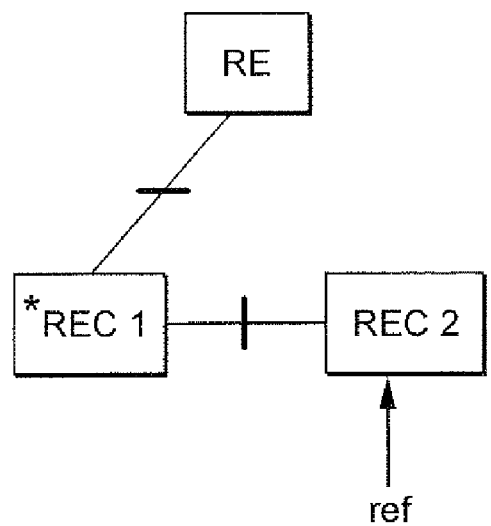

FIG. 12 is similar to FIG. 7 but the timing reference is provided to REC2 rather than REC1. As a result, REC1 sends its timing information to REC2 which performs the phase comparison and returns a timing adjustment to the REC1. REC1 adjusts its timing to synchronize with REC2 and also forwards the timing information to the RE.

Figure 13:
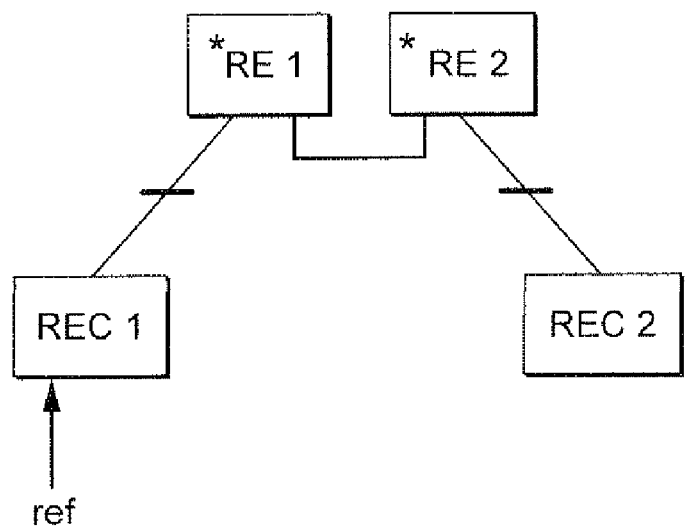

Yet another multi-REC configuration is shown in FIG. 13. REC1 is coupled to RE1, and REC2 is coupled to RE2. RE1 and RE2 are coupled via a suitable interface. The timing reference information is provided to REC1. In this configuration, RE1 forwards the timing information received from its connected REC1 to the other RE. The other RE2 measures the time difference from the timing reference from RE-RE interface compared to the timing information received from its connected REC2 and sends adjustment information based on the timing difference to REC2. Typically, the RE connected to the REC acting as synchronization master forwards the time information to the other RE, which locks its PLL to that interface, and reports time differences to the REC not acting as synchronization master. But in general, the phase comparison may be performed in RE1 or RE2 with the timing information received from respective REC being forwarded to the master RE by the other RE.

CPRI-based radio base station may time-synchronize using phase detectors in an RE. The RE makes relative frequency and time measurements between the regenerated CPRI clocks and the incoming reference and sends those measurements to one or multiple RECs as input to the synchronization generation. In RE-based synchronization, the time base is preferably the same for all REs, and thus, is generated from the REC.

Figure 14:
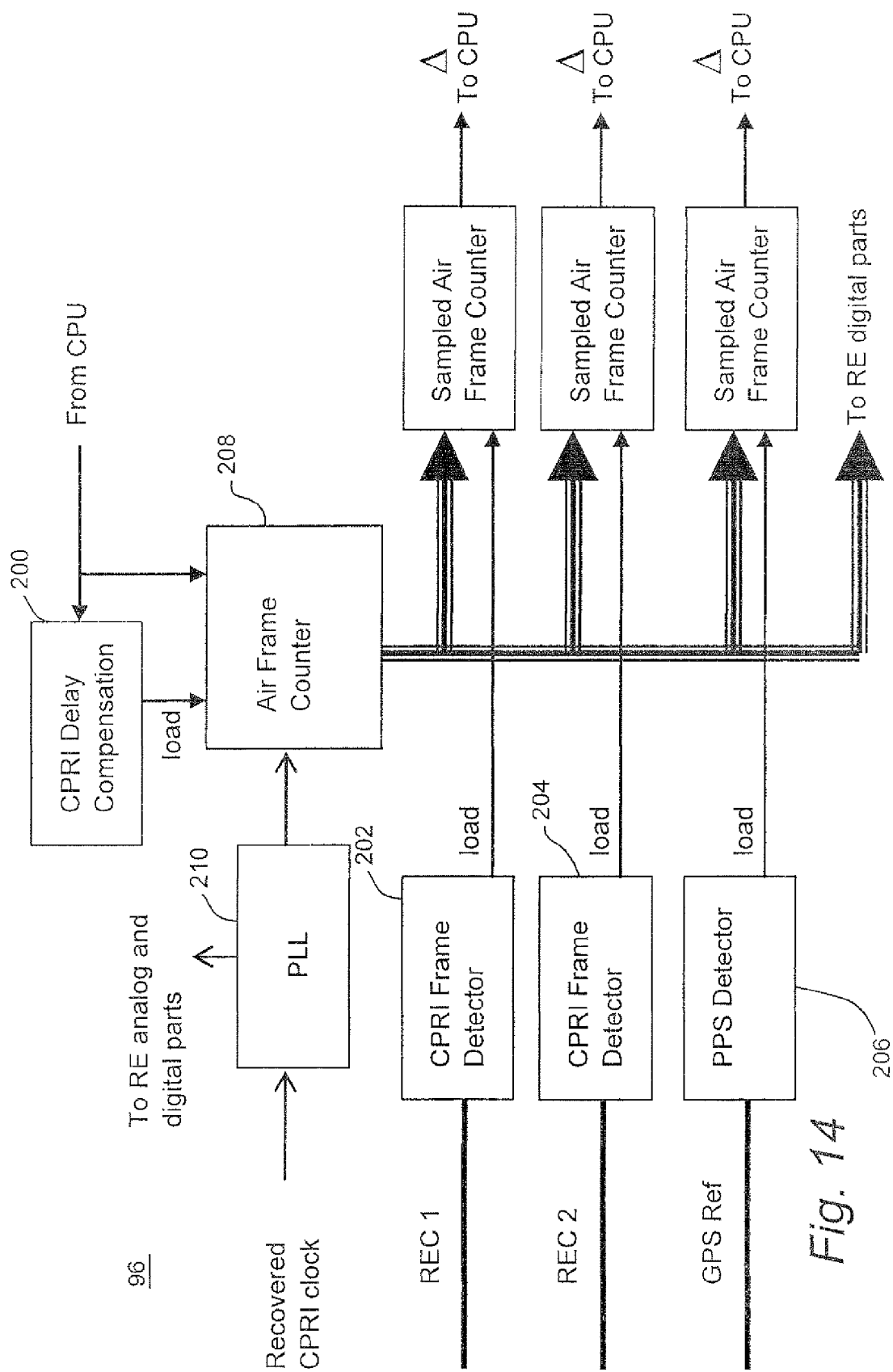
FIG. 14 is a non-limiting, example function block diagram of a CPRI-based synchronization block of a RE.

FIG. 14 is a non-limiting, example function block diagram of a CPRI-based synchronization block 96 of an RE. A central part of the synchronization block 96 is an Air Frame Counter (AFC) 208 which is the source of the RE's timing. The Air Frame Counter 208 is clocked by a phase locked loop (PLL) 210 which is locked to the recovered CPRI bit clock provided by the REC acting as synchronization master. In this way, the AFC 208 is frequency-locked to the Air Frame Counter of the master REC. The phase of the Air Frame Counter 208 is controlled by the frame detected on the received CPRI and adjusted with the CPRI propagation delay, i.e., the propagation time from the REC timing unit 30 to the RE timing unit 38. The propagation delay is measured by the REC, sent to the RE via a C&M link, and then applied to the synchronization block 96 by the CPU 90 via CPRI delay compensation block 200.

The value of the Air Frame Counter 208 can be stored at the reception of any one of a number of signals. Those signals include an incoming CPRI interface frame strobe from REC1 and REC2, which are detected by respective detectors 202 and 204, or an external time reference such as a GPS PPS or other timing reference detector 206. The CPU 90 reads out the sampled AFC value and uses it either to control the Air Frame Counter 208, e.g., to lock it to an incoming timing reference signal from the CPRI interface of a reference/master REC, and/or to measure the phase or timing difference between the time reference (e.g., the GPS signal) and the timing information from one or more RECs requiring synchronization. In the latter situation, the timing difference is provided to one or more RECs to adjust its synchronization block.

Figure 15:
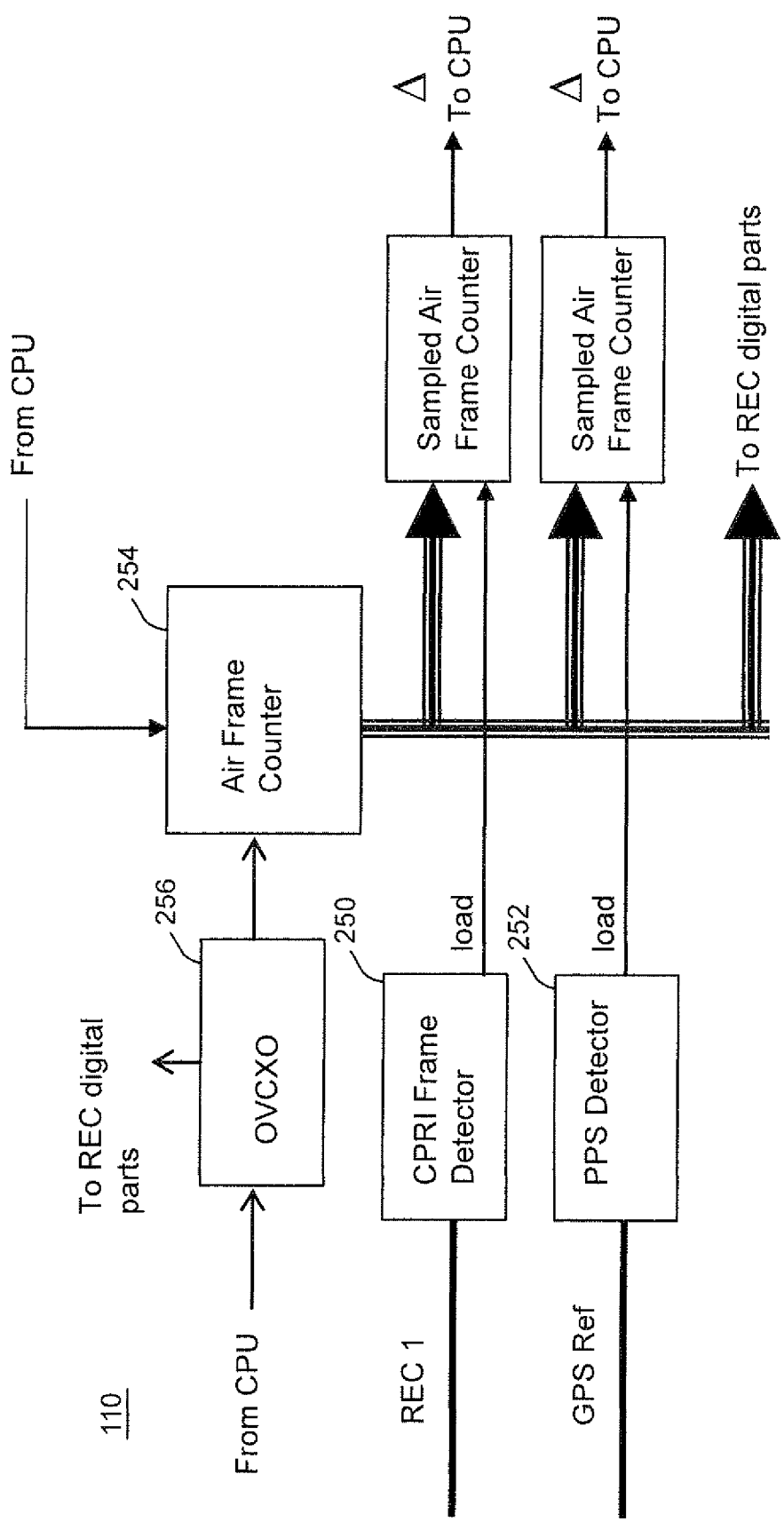
FIG. 15 is a non-limiting, example function block diagram of a CPRI-based synchronization block of a REC.

FIG. 15 is a non-limiting, example function block diagram of a CPRI-based synchronization block 110 of an REC. A central part of the synchronization block 110 is the Air Frame Counter (AFC) 254 which is the source of the REC's timing. The Air Frame Counter 254 may be clocked, for example, by an Oven-mounted Voltage Controlled Crystal Oscillator (OVCXO) 256 (but other clocks may be used). A synchronization algorithm in the CPU 104 controls the OVCXO 256 to generate the frequency base for the REC and the Air Frame Counter 254 to generate the time base of the REC. The Air Frame Counter 254 and the OVCXO 256 are used to generate outgoing CPRI interface timing and frequency information for the REC. For example, the Air Frame Counter 254 value may be stored at reception of an incoming CPRI interface frame strobe corresponding to a reference timing provided to this REC, as detected by CPRI frame detector 250, or by an external time reference, such as a GPS PPS or other reference detector 252. The CPU 104 reads out the sampled value and uses it to control the Air Frame Counter 254 and the OVCXO 256. The CPU 104 may also receive corresponding sample values via a C&M link from an RE or another REC, and apply these in the control algorithm.

Figure 16:
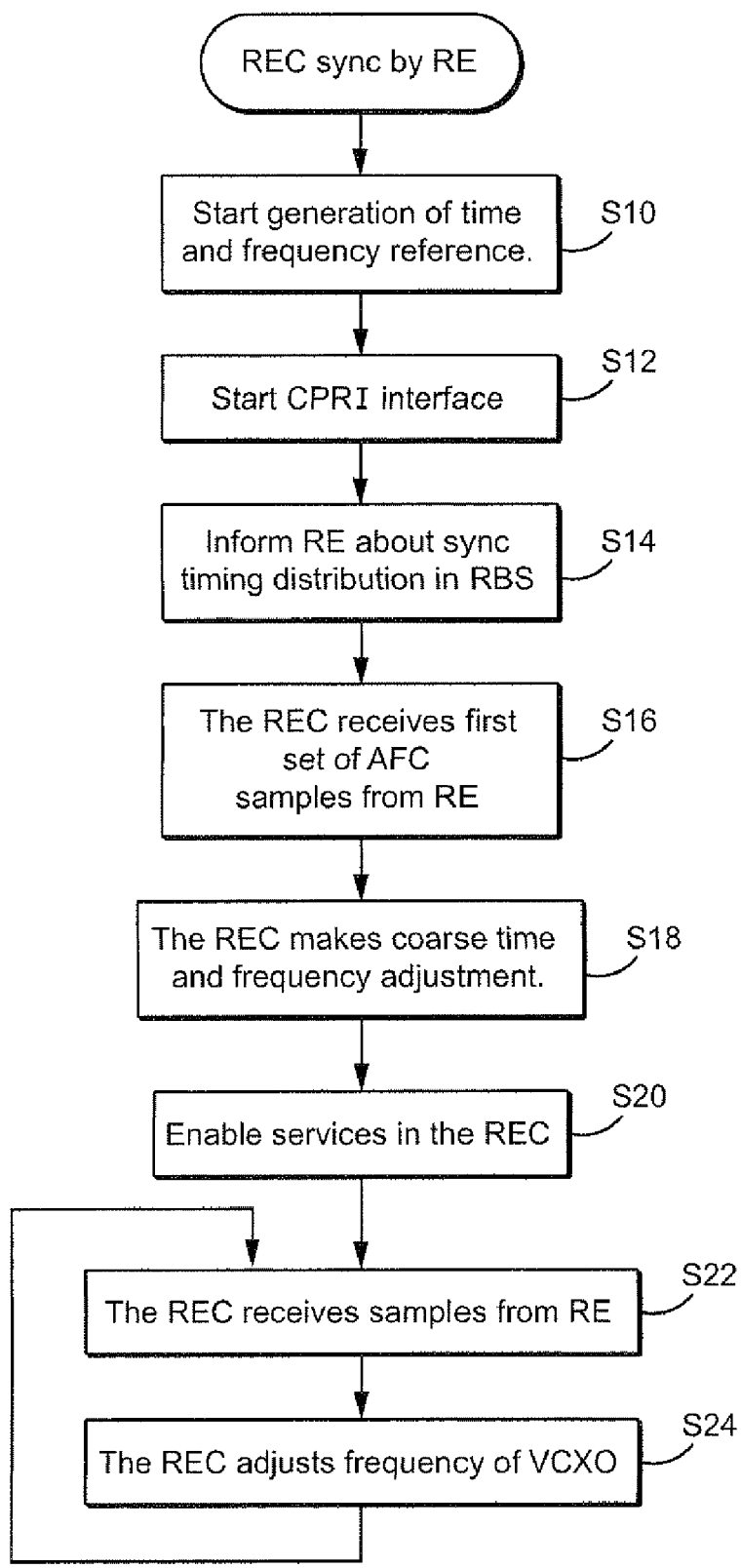
FIG. 16 is a flow chart diagram illustrating non-limiting, example procedures for synchronizing an REC and RE in a CPRI-based system.
Figure 17:
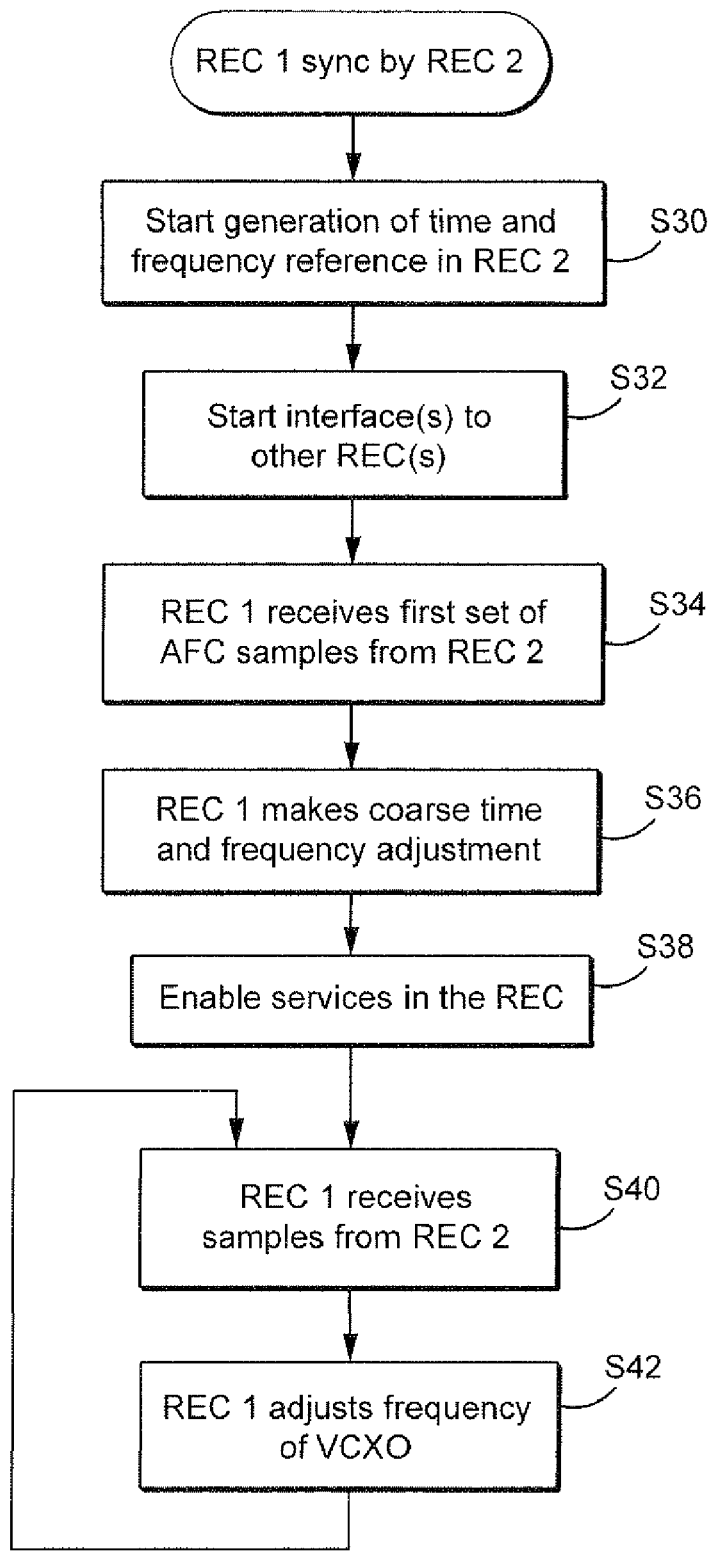
FIG. 17 is a flow chart diagram illustrating non-limiting, example procedures for synchronizing a first REC and a second REC in a CPRI-based system.
Figure 18:
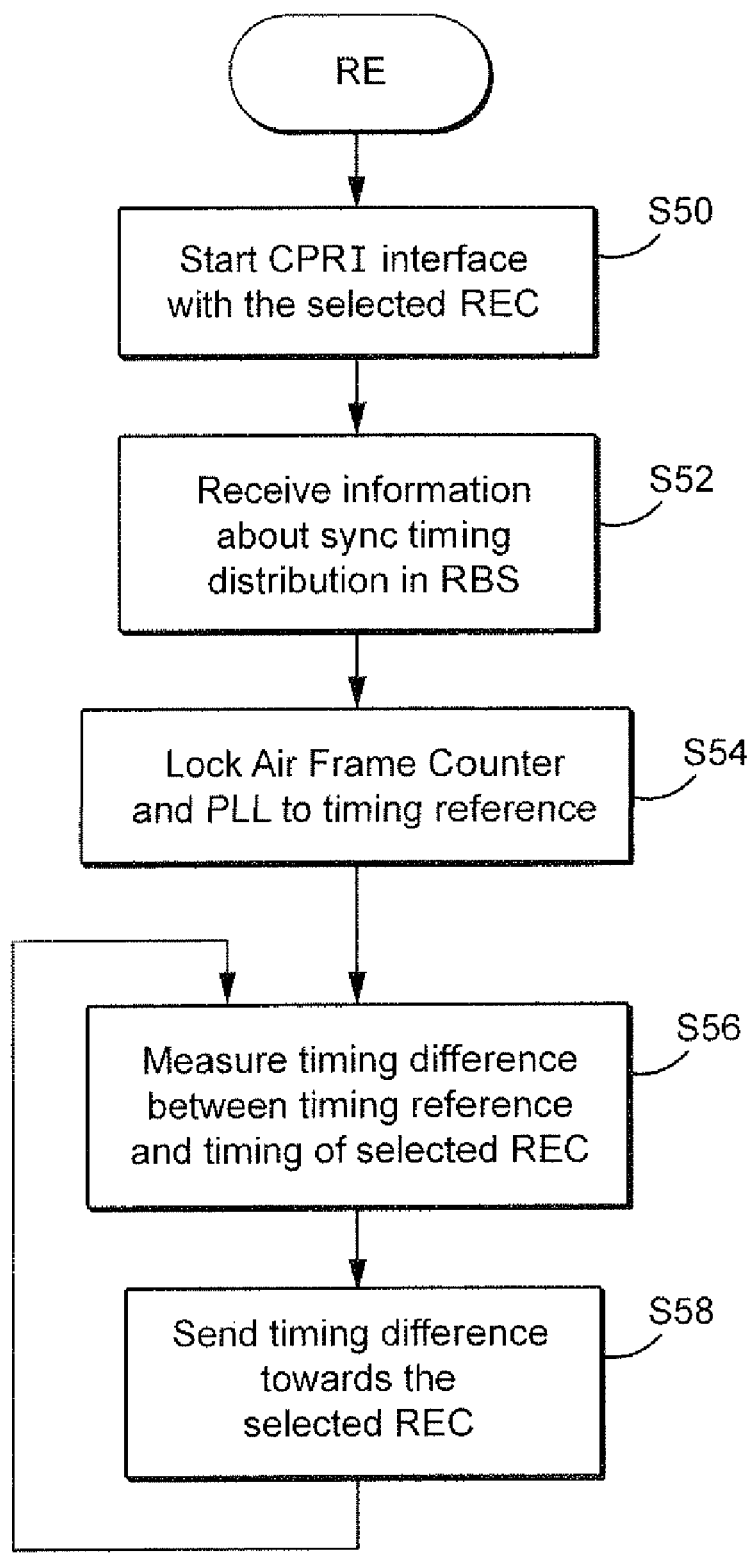
FIG. 18 is a flow chart diagram illustrating non-limiting, example procedures for synchronizing RECs and an RE in a CPRI-based system where the RE performs the phase comparison.

Non-limiting example sequences describing the behavior of the various RE and REC units in accordance with the non-limiting CPRI-based embodiments shown in FIGS. 14 and 15 are shown in FIGS. 16, 17, and 18. FIG. 16 is a flow chart diagram illustrating non-limiting, example procedures for synchronizing an REC and RE in a CPRI-based system. The flowchart is labeled "REC Sync by RE" to indicate that the RE is synchronizing with an REC having a direct connection to the RE, e.g., REC1 in FIG. 7. The REC timing unit (which generates both time and frequency information) is started in step S10. CPRI interface communications between the RE and one or more RECs are started in step S12. At step S14, the RE is informed by the REC acting as synchronization master about the distribution of synchronization information to various nodes in the radio base station, i.e., which REC(s) need(s) a timing adjustment and which node receives the synchronization reference information. In this example, the RE provides the synchronization information, in the form of an air frame counter (AFC) sample value, to the REC that needs timing adjustment in step S16. The REC makes coarse timing and frequency adjustments based on the AFC sample value received in step S18. This will give a coarse synchronization of the nodes, and the REC can start to enable its services, such as setting up the cells of the radio network, in step S20. The REC continues to receive AFC sample values from the RE in step S22 and uses them to adjusts the frequency of its voltage control oscillator 256 in step S24.

FIG. 17 is a flow chart diagram illustrating non-limiting, example procedures for synchronizing a first REC and a second REC in a CPRI-based system. The flowchart is labeled "REC1 Sync by REC2" and relates to a situation where the timing comparison is performed in REC2 rather than in the RE, such as in FIG. 9. Steps S30 and S32 are similar to steps S10 and S12 described in FIG. 16. In step S34, REC1 receives a first set of AFC samples, corresponding to timing adjustment information, from REC2. REC1 then makes coarse time and frequency adjustments (step S36), enables services in the REC1 (step S38), receives samples from REC2 (step S40), and adjusts its VCXO (step S42), similar to steps S18-S24 as described in FIG. 16.

FIG. 18 is a flow chart diagram illustrating non-limiting, example procedures for synchronizing RECs and an RE in a CPRI-based system where the RE performs the phase/timing comparison and distributes the timing difference to one or both of the RECs for timing adjustment. The flowchart describes possible steps that the RE in FIG. 14 may perform. The CPRI interface with each of the RECs is started in step S50, and information about synchronization timing distribution in the base station is received by the RE in step S52. The selected RE locks its air frame counter and phase lock loop to the CPRI interface of master REC. The RE measures a timing difference between the synchronization timing reference from the master REC and the timing information of the selected REC to be synchronized in step S56. The RE then sends the timing difference towards the selected REC in step S58. The timing difference may be provided either directly by the RE or the via a cascade interface connection with the other REC coupled to the RE.

The technology described provides a number of advantages. First, it provides an inexpensive and high availability solution to synchronize multiple RECs with each other when using the same RE. Second, the technology provides an inexpensive deployment of a GPS receiver that only needs minimum cabling and lightning protection. Third, cascading of RECs and REs is supported. Fourth, the number of cascaded REs and RECs is scalable. Fifth, an REC can be synchronized from any other similarly capable REC on site which means that the technology can be easily migrated to other vendor sites.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for operating a radio base station that includes a first radio equipment controller (REC) node, a second radio equipment controller (REC) node, and a radio equipment (RE) node for transceiving information over a radio interface with one or more radio terminals, wherein the first REC node and the second REC node are physically separate from the RE node and the first REC node and/or the second REC node are/is connected to the RE node by a transmission link, comprising:
   providing synchronization reference information to one of the REC and RE nodes;
   comparing the synchronization reference information with timing information for another of the REC nodes to generate a timing difference; and
   using the timing difference to adjust a timing unit at the another node.

2. The method in claim 1, wherein the first REC node is configured to operate in accordance with a first type of radio communications technology and the second REC node is configured to operate with a second different type of radio communications technology.

3. The method in claim 1, wherein one or more interfaces between the nodes in radio base station is a CPRI interface.

4. The method in claim 1, wherein the one node is one of the REC nodes, the comparing is performed in the RE node or in one of the REC nodes, and the RE node synchronizes its timing to the synchronization reference information received from the one node.

5. The method in claim 1, wherein the one node is the RE and the comparing is performed in the RE node or in one of the REC nodes.

6. The method in claim 1, wherein the REC nodes are connected in cascade and one REC node passes the timing difference to the other REC node.

7. The method in claim 1, wherein the REC nodes are connected in parallel, and wherein one REC node passes the timing difference to the other REC node or the RE node passes the timing difference to the other REC node.

8. The method in claim 1, wherein multiple RE nodes are connected in cascade, and wherein at least one REC node is connected to each RE node.

9. The method in claim 1, wherein the RE node receives GPS timing information and the synchronization reference information is based on the received GPS information.

10. The method in claim 1, wherein the REC node receives the synchronization reference information from a transport network.

11. The method in claim 1, wherein the synchronization reference information includes timing information, frequency information, or both.

12. A radio base station, comprising:
   a first radio equipment controller (REC) node;
   a second radio equipment controller (REC) node; and
   a radio equipment (RE) node for transceiving information over a radio interface with one or more radio terminals, wherein the first REC node and the second REC node are physically separate from the RE node and one or both of the first REC node and/or the second REC node are/is connected to the RE node by a transmission link,
   wherein one of the REC and RE nodes receives or generates synchronization reference information, compares the synchronization reference information with timing information for another of the REC nodes to generate a timing difference, and provides the timing difference to the another REC node to achieve timing synchronization between the RE node, the first REC node, and the second REC node.

13. The radio base station in claim 12, wherein the first REC node is configured to operate in accordance with a first type of radio communications technology and the second REC node is configured to operate in accordance with a second different type of radio communications technology.

14. The radio base station in claim 12, wherein one or more interfaces between the nodes in radio base station is a CPRI interface.

15. The radio base station in claim 12, wherein the one node is one of the REC nodes, the comparing is performed in the RE node or in one of the REC nodes, and the RE node synchronizes its timing to the synchronization reference information received from the one node.

16. The radio base station in claim 12, wherein the one node is the RE node and the comparing is performed in the RE node or in one of the REC nodes.

17. The radio base station in claim 12, wherein the REC nodes are connected in cascade and one REC node passes the timing difference to the other REC.

18. The radio base station in claim 12, wherein the REC nodes are connected in parallel, and wherein one REC node passes the timing difference to the other REC node or the RE node passes the timing difference to the other REC node.

19. The radio base station in claim 12, wherein multiple RE nodes are connected in cascade, and wherein at least one REC node is connected to each RE node.

20. The radio base station in claim 12, wherein the RE node receives GPS timing information and the synchronization reference information is based on the received GPS information.

21. A radio equipment (RE) node, comprising:
   a controller;
   radio transceiving circuitry, coupled to the controller, for transceiving information over a radio interface with one or more radio terminals;
   one or more communications link interfaces for communicating with a first radio equipment controller (REC) node and a second radio equipment controller (REC) node, where the RE node and the first and second REC nodes together form a radio base station;
   a timing unit for receiving synchronization reference information; and
   comparator circuitry configured to compare synchronization information from one of the first REC node and the second REC node with the synchronization reference information and provide synchronization adjustment information for use at the one REC node to permit synchronization between the first REC node, the second REC node, and the RE node.

22. The RE node in claim 21, wherein the first REC node is configured to operate in accordance with a first type of radio communications technology and the second REC node is configured to operate in accordance with a second different type of radio communications technology.

23. The RE node in claim 21, wherein the timing unit receives synchronization reference information from a GPS receiver.

24. The RE node in claim 21, wherein the timing unit receives synchronization reference information from one of the REC nodes.

25. The RE node in claim 21, wherein the timing unit includes:
   an air frame counter, and
   means for loading the air frame counter with a value corresponding to the synchronization reference information.

26. The RE node in claim 21, wherein the timing unit provides synchronization adjustment information directly to the one REC node.

27. The RE node in claim 21, wherein the timing unit provides synchronization adjustment information indirectly to the one REC node via the other REC node.

28. A first radio equipment controller (REC) node, comprising:
   a controller;
   an RE communications link interface for communicating with a first radio equipment (RE) node;
   an REC communications link interface for communicating with a second radio equipment controller (REC) node, where the RE node and the first and second REC nodes together form a radio base station; and
   a timing unit,
   wherein the first REC node is configured to provide to the second REC timing difference information determined between synchronization reference information and timing information received from the second REC to achieve timing synchronization between the RE node, the first REC node, and the second REC node.

29. The first REC node in claim 28, wherein the first REC node is configured to operate in accordance with a first type of radio communications technology and the second REC node is configured to operate in accordance with a second different type of radio communications technology.

30. The first REC node in claim 28, further comprising:
   a timing comparator connected to the timing unit,
   wherein the timing comparator compares the synchronization reference information with timing information received from the second REC to generate the timing difference information and provides the timing difference information to the second REC over the REC communications link interface.

31. The first REC node in claim 28, wherein the first REC node is configured to receive over the RE communications link interface the synchronization reference information from the RE node and to provide the timing difference information to the second REC over the REC communications link interface.

32. The first REC node in claim 28, wherein the first REC node is configured to receive the synchronization reference information from an external timing source.

\* \* \* \* \*

UNITED STATES PATENT AND TRADEMARK OFFICE
CERTIFICATE OF CORRECTION

| | | |
|---|---|---|
| PATENT NO. | : 8,050,296 B2 | Page 1 of 1 |
| APPLICATION NO. | : 12/147258 | |
| DATED | : November 1, 2011 | |
| INVENTOR(S) | : Österling | |

It is certified that error appears in the above-identified patent and that said Letters Patent is hereby corrected as shown below:

In Column 2, Line 46, delete "embodiments" and insert -- embodiment, --, therefor.

In Column 2, Line 59, delete "parallel and" and insert -- parallel, and --, therefor.

In Column 3, Line 17, delete "sychronization" and insert -- synchronization --, therefor.

Signed and Sealed this
Fifteenth Day of May, 2012

David J. Kappos
*Director of the United States Patent and Trademark Office*